United States Patent
Breslin et al.

(10) Patent No.: US 7,234,065 B2
(45) Date of Patent: Jun. 19, 2007

(54) SYSTEM AND METHOD FOR MANAGING DATA PRIVACY

(75) Inventors: Jodi Breslin, Great Neck, NY (US); Evelyn Borgia, Hauppage, NY (US); Graham de Gottal, Readington, NJ (US)

(73) Assignee: JPMorgan Chase Bank, New York, NY (US)

( * ) Notice: Subject to any disclaimer, the term of this patent is extended or adjusted under 35 U.S.C. 154(b) by 713 days.

(21) Appl. No.: 10/664,530

(22) Filed: Sep. 17, 2003

(65) Prior Publication Data

US 2004/0098285 A1    May 20, 2004

Related U.S. Application Data

(60) Provisional application No. 60/411,370, filed on Sep. 17, 2002.

(51) Int. Cl.
*G06F 1/24* (2006.01)
(52) U.S. Cl. .................. 713/193; 713/165; 713/168
(58) Field of Classification Search ............. 713/193, 713/165, 168
See application file for complete search history.

(56) References Cited

U.S. PATENT DOCUMENTS 3,705,385 A * 12/1972 Batz .................. 340/870.02
3,860,870 A * 1/1975 Furuya .................. 370/204
4,013,962 A * 3/1977 Beseke et al. .......... 455/135

\* cited by examiner

*Primary Examiner*—Thomas R. Peeso
(74) *Attorney, Agent, or Firm*—Hunton & Williams LLP

(57) ABSTRACT

A system and method for assessing the risk associated with the protection of data privacy by software application. A decision engine is provided to assess monitor and manage key issues around the risk management of data privacy. The system creates a core repository that manages, monitors and measures the data privacy assessments of applications across an institution (e.g., a corporation). The system and method employs automated questionnaires that require responses from the user (preferably the manager responsible for the application). The responses are tracked in order to evaluate the progress of the assessment and the status of the applications with respect to compliance with the enterprise's data privacy policies and procedures as well as the regulations and laws of the jurisdictions in which the application is operated. Once a questionnaire has been completed, the application is given ratings both with respect to the data privacy impact of the application and the application's compliance with the data privacy requirements. If a risk exists, a plan for reducing the risk or bringing the application into compliance can be formulated, and progress towards compliance can be tracked. Alternatively, an identified exposure to risk can be acknowledged through the system, which requires sign off by various higher level managers and administrators.

30 Claims, 11 Drawing Sheets

| Please indicate the type(s) of sensitive information this application contains. | Process | Transmit | Collect | Store | Customer Info | Employee Info | N/A |
|---|---|---|---|---|---|---|---|
| Social Security Number | □ | □ | □ | □ | □ | □ | ☑ |
| Health Related Information<br>• Some examples include: medical records, dental records | ☑ | ☑ | ☑ | ☑ | ☑ | □ | □ |
| Compensation<br>• Some examples include: stock options, bonus, incentives, payroll information | ☑ | ☑ | □ | □ | □ | ☑ | □ |
| Contributions / Donations<br>• Some examples include: United Way, Blood Drives, College Funds | □ | ☑ | ☑ | □ | □ | ☑ | □ |
| Performance information<br>• Some examples include: performance review, performance rating | ☑ | ☑ | ☑ | □ | □ | ☑ | □ |
| Tuition Reimbursement information<br>• Some examples include: grades, courses taken | □ | □ | □ | □ | □ | □ | ☑ |
| License / Certification information<br>• Some examples include: financial licenses, insurance certification | □ | □ | □ | □ | □ | □ | ☑ |
| Work Experience Information<br>• Some examples include: background checks, references, resumes | □ | □ | □ | □ | □ | □ | ☑ |
| Association / Committee affiliate information<br>• Some examples include: membership in employee networking groups, membership in external groups | □ | □ | □ | □ | □ | □ | ☑ |
| Bio - metric information<br>• Some examples include: fingerprints, hand scans, face scans, retinal scans, DNA | □ | □ | □ | □ | □ | □ | ☑ |

Submit  Reset        1 2 3 Next

Customer Data Privacy Impact Rating  HIGH   Employee Data Privacy Impact Rating  HIGH

FIG. 5

Chase Auto Finance | Application Control Policy - | Customer Servicing Processes    550    560    565    570

| | Yes | No | N/A | Comments/Process |
|---|---|---|---|---|
| Are customer service agents trained to safeguard the information they have access to from social engineering tactics? If so Please attach the procedure / awareness documentation. | ○ | ● | ○ | 📄 |
| Are customer service agents trained to not to enter sensitive information into comment fields that may not require authorization? If so Please attach the procedure / awareness documentation. | ● | ○ | ○ | 📄 |
| Are there procedures that define what a customer service agent may deliver from this application to customers and/or employees via the E-Mail contact channel? If so Please attach the procedure / awareness documentation. | ○ | ● | ○ | 📄 RA |
| Are there procedures that define what a customer service agent may deliver from this application to customers and/or employees via the Fax contact channel? If so Please attach the procedure / awareness documentation. | ○ | ● | ○ | 📄 CAP |
| Are there procedures that define what a customer service agent may deliver from this application to customers and/or employees via the Fax contact channel? If so Please attach the procedure / awareness documentation. | ● | ○ | ○ | 📎 |

[Submit] [Reset]

Back to Categories

Retail & Middle Market Financial Services Status

| Senior Business Executive | Line of Business | Data Privacy | Corrective Action Plan | Risk Acknowledgment | Major Control Issues |
|---|---|---|---|---|---|
| Norman Buchan | Chase Auto Finance | ▶ | ◉ | ◉ | ◉ |
| Richard Srednicki | Chase Cardmember Services | ○ | ● | ● | ● |
| Steve Rotella | Chase Home Finance | ▶ | ◉ | ● | ● |
| Frank Lourenso | Commercial Banking Middle Market | □ | | ● | ● |

| Application Name | Information Owner | Data Privacy Status ||| Data Privacy Corrective Action Plan | Data Privacy Risk Acknowledgment | Data Privacy Major Control Issue |
| --- | --- | --- | --- | --- | --- | --- | --- |
| | | Customer Data Privacy Impact Rating | Employee Data Privacy Impact Rating | Data Privacy | | | |
| Production Applications ||||||||
| Application Control Policy | Christine O'Connor | HIGH | HIGH | ◧ | ◐ | ◐ | ◐ |
| Application Test Continuity | trainee trainee | HIGH | HIGH | ◨ | ● | ● | ● |
| Prod Test | | | | ○ | | | ● |
| Risk Acknowledgment UAT | Tara Dicintio | HIGH | HIGH | ■ | ● | ● | ● |
| SLH Production Application | | HIGH | HIGH | ◧ | ● | ● | ● |
| SLH Test App1 | Susan L. Hale | HIGH | HIGH | ■ | ● | ● | ● |

FIG. 11

SYSTEM AND METHOD FOR MANAGING DATA PRIVACY

CROSS REFERENCE TO RELATED APPLICATIONS

This application claims priority to U.S. Provisional Application No. 60/411,370, filed on Sep. 17, 2002 the entirety of which is incorporated herein by reference.

FIELD OF THE INVENTION

The present invention generally relates to systems and methods for managing data privacy, and more particularly to systems and methods for managing the risk associated with compliance with applicable laws corporate policy with respect to the collection, use and storage of an individual's data.

BACKGROUND OF THE INVENTION

Risk management relates to procedures for assessing and managing risk that are established by the enterprise, with accompanying directives by management to comply with the procedures. For example, a given manager of a department may be required to establish the level of risk associated with the operation of a particular computer system (e.g., the risk of losing use of such a computer system for some period of time). This manager may formulate a system for evaluating and reporting the risk, that can be used by lower level and project managers. For example, on a periodic basis such as quarterly, the managers for a given department might be required to communicate to upper management the various risk factors and risk evaluations that are related to its computer information systems operations. The risk factor related information can be documented through various forms or questionnaires for evaluating risk and risk factors associated with projects for which they are responsible. These forms and questionnaires can be compiled into reports and other summary data to provide a department manager with a fairly good idea of the level of compliance with various enterprise procedures.

Typically, if a group within the department is not in compliance with the established procedures for the enterprise, this information can be so noted in the summary or compiled data presented to the department manager. In such a case, the department manager can establish plans to bring the group into compliance, and to monitor the status of the group in progressing with the plan.

The impact of evaluating the risk for a given enterprise can have serious consequences with regard to the success or profitability of the enterprise. If the enterprise has established procedures that are designed to protect the enterprise from liability, or otherwise assure that levels of risk within the enterprise are minimized, the enterprise can be exposed to liability if the procedures are not properly followed. For example, in the area of data privacy, most responsible enterprises have policies and procedures for protecting the personal information of their employees and customers. Further more, each state and Federal government has laws regulating the privacy of personal information. Failure to follow these policies, procedures and laws can expose the enterprise to significant liability.

In typical enterprises, the analysis, statuses and reporting to upper management of the procedures with respect to data privacy are often haphazard and inconsistent. For example, some managers may find the requirement of filling out forms and answering questionnaires to be an inefficient use of time, and fail to effectively complete risk assessments. Other managers may have an attitude that protecting data privacy is not an important priority. Furthermore, most departments fail to evaluate the external dependencies that it has, and the impact on its ability to perform its functions should those external entities fail to protect the employees and customer's data.

Where tools for the risk assessments with respect to data privacy do exist., they tend to be form intensive, and inconsistent between various enterprise locations. It is difficult to track and maintain the data that can be obtained from forms related to assessment of data privacy risk, and even more difficult to take an enterprise view of such risk, which is absolutely required for effectively managing the liability of the enterprise. Some computer based systems have been developed to overcome the difficulties with traditional paper based risk assessment systems. It does not appear that any such systems have been developed with respect to assessing and containing the risk associated with data privacy.

SUMMARY OF THE INVENTION

The present invention is a system and method for determining an enterprises' compliance with data privacy policies, procedures and laws and assessing the risk associated with non-compliance. The system and method of the present invention provides the capabilities to manage and monitor the protection of employees' and customers' private data. It should be noted that the requirements of data privacy is equally applicable to the information of employees as well as it is to customer's data. For example, employers in all fifty states must comply with the privacy regulations associated with the Federal law entitled the Health Insurance Portability and Accountability Act (HIPAA). This invention enhances current processes to provide a decision engine around key data privacy issues providing the capability for enhanced, monitoring and management around the risk management function.

A first step of the present invention is to create a core repository that manages, monitors and measures all data privacy assessments across an institution (e.g., a corporation). The invention eliminates redundant systems and functions related to data privacy assessment within each of the Lines of Business (LOBs) of the institution.

The present invention utilizes a six-step data privacy management system to develop, assess and test the risk associated with the data privacy protection practices and procedures employed by a corporation. The system identifies and tracks outstanding issues related to data privacy through final resolution or acceptance of the risk posed by the data privacy issue. The system and method employs automated questionnaires that require responses from the user (preferably the manager responsible for the data, i.e., the data owner). The responses are tracked in order to evaluate the progress of the assessment and the status of the data privacy protection program with respect to compliance with the enterprise's policies and procedures as well as state and Federal laws.

One or more responsible parties for a given area are identified or appointed to be responsible for responding to compliance questionnaires. The parties fill in questionnaires designed to focus on various features of risk assessment for specific aspects of the data privacy procedures. For example, the responsible parties for an area that performs customer services would be asked if the customer service agents have been trained to safeguard a customer's private information. The rating for this group's data privacy protection may depend upon such factors as whether the group has established procedures for which information the customer service representatives can provide to it customers and procedures for which information the customer service representatives can collect from customers.

Once a questionnaire or series of questionnaires has been completed, the compliance of the group with the enterprises requirements for the protection of data privacy (including compliance with applicable sate and Federal laws) is assessed and the group is given an overall rating of exposure to risk. Areas of risk can be acknowledged, prompting a sensitivity rating, such as severe, negligible and so forth. Once risk is acknowledged, a plan for reducing the risk or bringing the groups procedures into compliance can be formulated, and progress towards compliance can be tracked. Alternatively, an identified exposure to risk can be disclaimed through the system, which requires sign off by various higher level managers and administrators.

Once the risk assessment is completed for various departments, a higher level manager can review exposure to risk on a broad perspective, and through a user interface, expand particular areas where high risk is identified as a problem. A risk category that is expanded reveals the different departments and/or projects which are responsible for data privacy and their associated risks or compliance statuses. The higher level manager can thus identify particular projects, activity areas and groups where risk exposure exists.

Requirements for compliance with regulatory demands, regulatory agencies, state law and Federal laws are built into the data privacy risk management tool. Project managers and higher level managers can determine in a glance if a particular group's practices and procedures are in compliance with the laws and guidelines. Higher level managers have broader access than lower level mangers to risk assessment information according to level of seniority. For example, a middle level manager can see all the risk assessment factors for each group that they manage, but can see no risk information beyond their allotted level. A high level manager can view all the information available to the mid level manager, in addition to any other manager or group for which the high level manager has responsibility. Accordingly, access to the system is provided on a secure basis that is reflective of the user's level of seniority.

The system also provides security features such as logon IDs and passwords. Access levels are assigned based on seniority or management status, and provide a mechanism for a secure review of risk exposure and compliance. Once data is entered into the system it cannot be modified unless the user has proper authorization. The system generates reports to inform persons or groups about their compliance status. A search tool is available for locating various business units, compliance areas, risk status levels and so forth. The system can also be used for training users on risk management policies, how risks are evaluated and how paths to compliance can be determined.

The system according to the present invention thus provides immediate compliance verification, a calendar of events, allows shared best practices and corrective action plans and provides a mechanism for risk acknowledgement communicated to other members of a hierarchy. The system can be used in any hierarchical organization including such risk sensitive enterprises as military units, space missions and highly financed business endeavors.

BRIEF DESCRIPTION OF THE DRAWINGS

For the purposes of illustrating the present invention, there is shown in the drawings a form which is presently preferred, it being understood however, that the invention is not limited to the precise form shown by the drawing in which:

FIG. 5 illustrates the data privacy risk impact interface;

FIG. 8 illustrates a data privacy questionnaire interface;

FIG. 11 is a detailed State of Health Report Card status screen; and

DETAILED DESCRIPTION OF THE INVENTION

Figure 1:
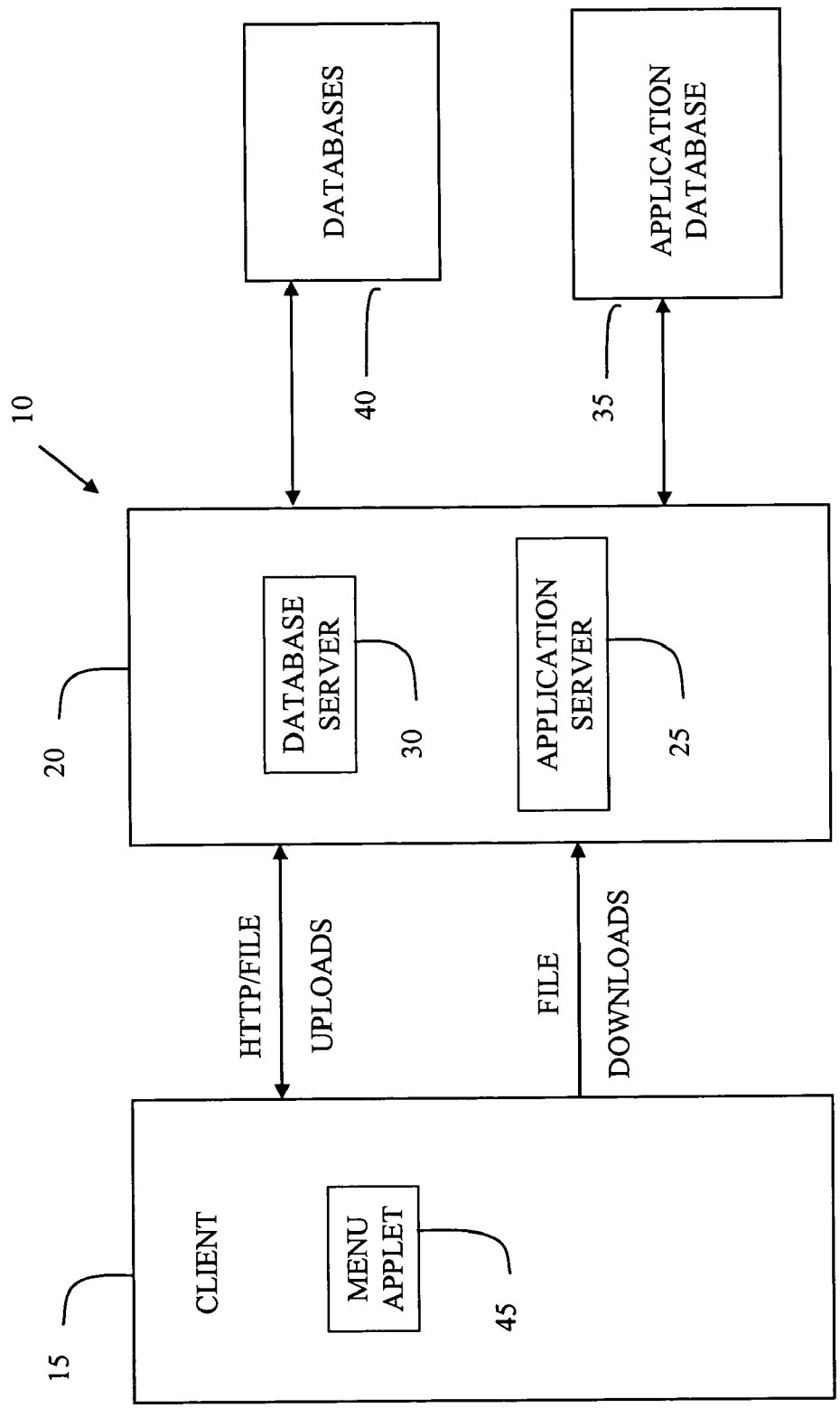
FIG. 1 illustrates the system of the present invention.

The system 10 of the present invention is illustrated in FIG. 1. As illustrated, system 10 is implemented using a distributed client/server architecture. The clients 15 (one illustrated) are distributed throughout the enterprise (corporation), while the servers 20 are centrally located with redundancies (not illustrated). This infrastructure consists of one application server 25 communicating with application database 35, and one database server 30 communicating with database 40. In a preferred embodiment, the application server 25 is running BEA WebLogic 5.1 that comprises middleware between the front-end web application and the application database 35. In this preferred embodiment, database server 30 is running Oracle 8.16 Server and database 40 is an Oracle database.

In the preferred embodiment, client 15 is a web based browser application. This application 15 preferably uses browsers that support Java applets and JavaScript such as Netscape 4.x or Internet Explorer 4.x. Menu applet 45 is an illustration of a Java applet supported in client 15.

Figure 2:
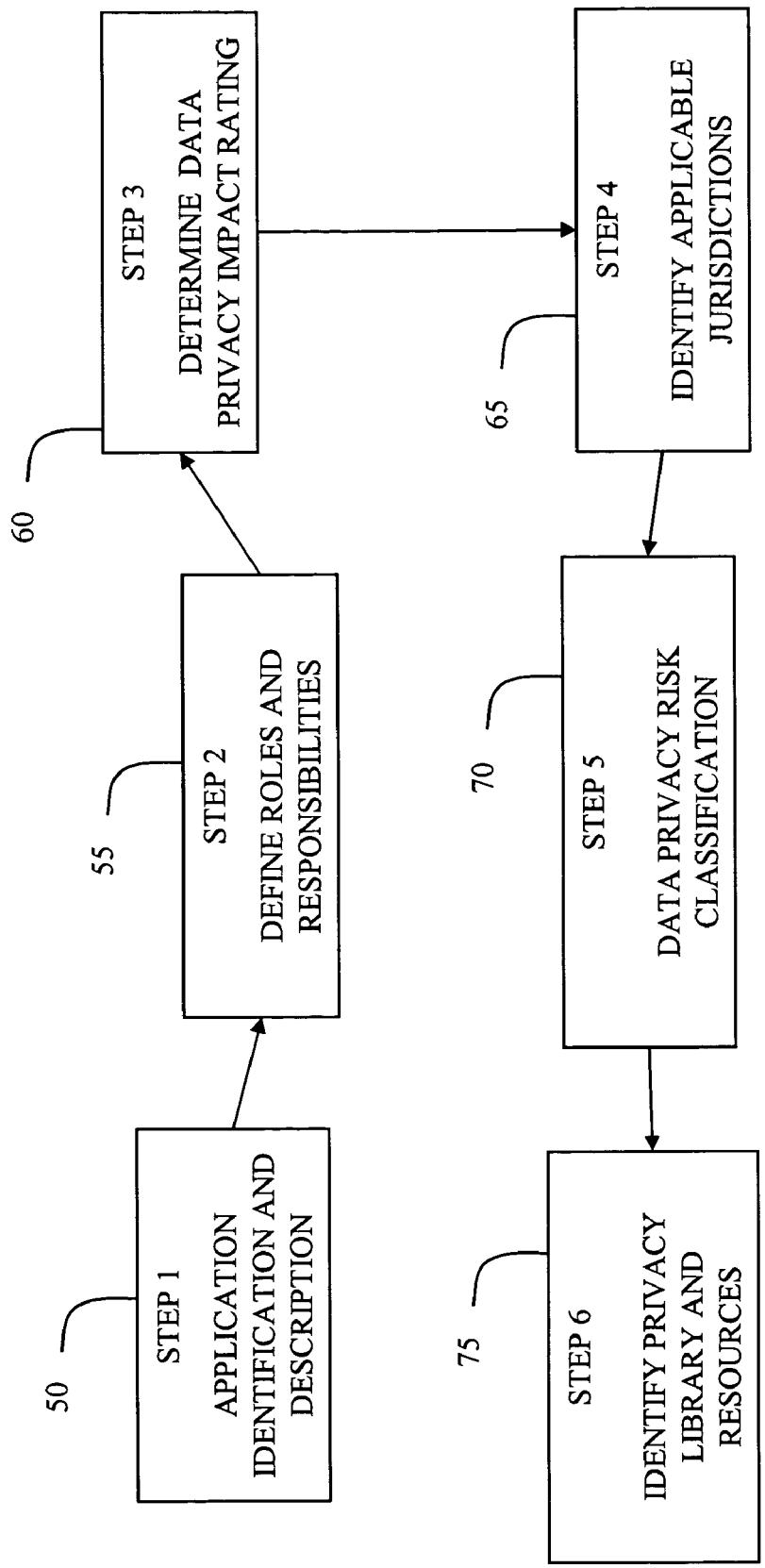
FIG. 2 depicts a high level view of the process of the invention.

FIG. 2 broadly describes the six step method of the present invention. The method enables tracking of data privacy issues across the enterprise and the six-step map provides for consistency and standardization for data privacy review and risk assessment throughout the organization. The six step method further provides for a comprehensive understanding of the enterprise's procedures and policies for protecting the privacy of employees' and customers' information. Gaps identified by the system of the present invention in this analysis are tracked and monitored by the information security team for the enterprise using the system of the present invention.

In step one (50) the person assigned with the responsibility to assess a particular application that involves data with a privacy component describes the application to system 10. The responsibility for describing the application is typically assigned to the manager in charge of the application, as this is the person in the organization with the most intimate knowledge about the current state of the operation of the application at any given time. As further described below, the information for each application is aggregated and rolled up for each higher level of management with the organization. In step two (55) of the process, various roles and responsibilities within the enterprise with respect to the application are defined and assigned. In step three (60) of the method, the impact of data privacy in regard to the operations of the application is reviewed and assessed. In step four (65), the user identifies all of the jurisdictions (e.g., states) in which the application is used. In step five (70) of the method, the manager completes a series of questionnaires that aid system 10 in assessing and classifying the risk associated with the application in regard to the protection of private data. Finally, in step 6 of the process, system 10 provides the manager with access to a library (preferably hyperlinks) to contacts with the enterprise knowledgeable about privacy issues, privacy policies of the enterprise, United States Federal legislation, state legislation and selected international legislation.

Figure 3:
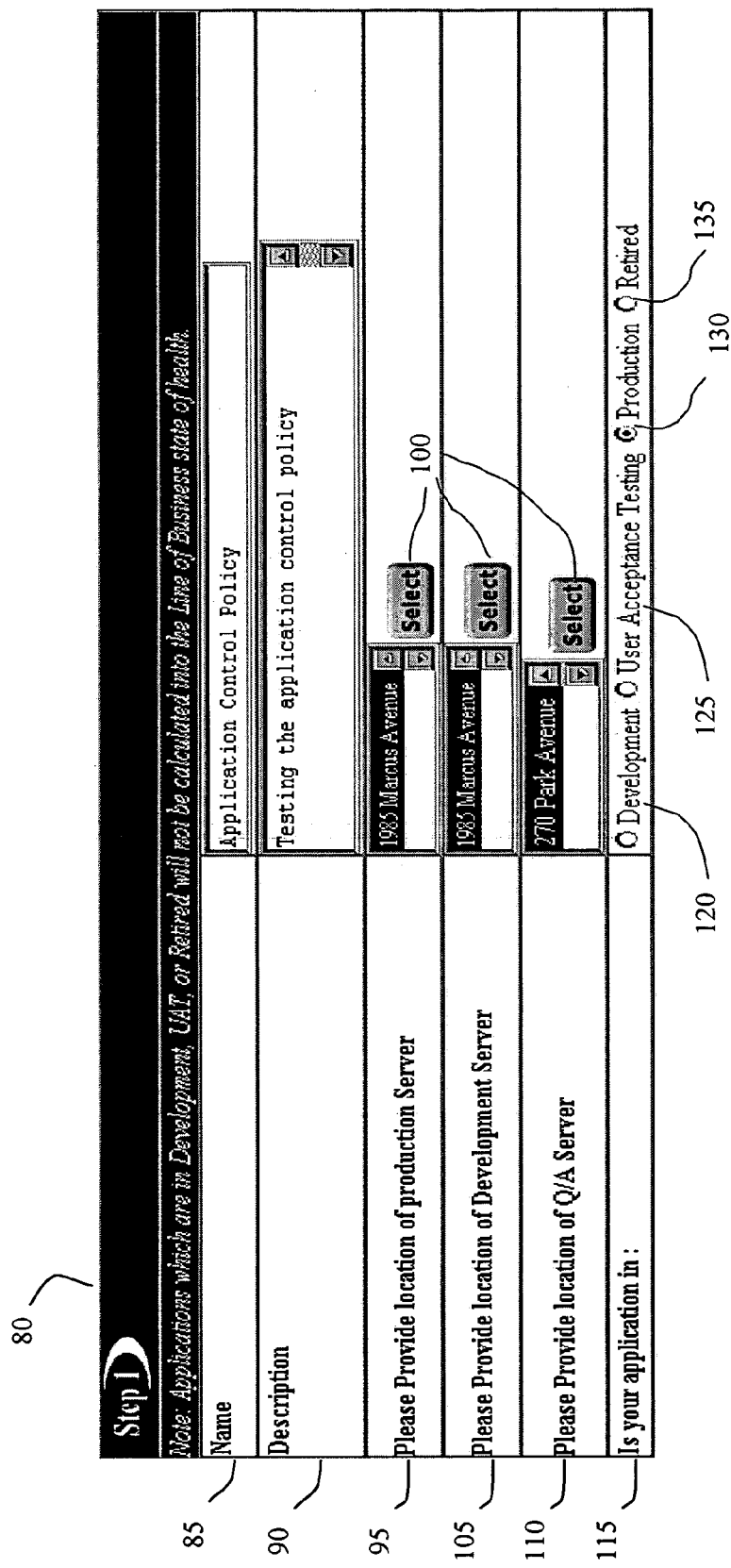
FIG. 3 is the interface of system 10 for describing an application with data privacy components.

FIG. 3 illustrates an input screen 80 employed by the user to describe an application under review. Much of the description contained herein is made in terms of the user interface screens (e.g., input screens) illustrated in the Figures. Further description herein relates to the processing of the information illustrated in these screens by the hardware components of system 10 illustrated in FIG. 1. As appreciated to those skilled in the art, the description of these screen and the accompanying description of the processing allows one to make and use system 10.

Screen 80 is used to input into system 10 the descriptions the applications employed by the enterprise. Only the applications that store or process data with a data privacy component are required to undergo the privacy review of system 10. Many applications employed by the enterprise have no contact with private data, e.g., applications that control the air conditioning in a particular facility. If an application does not have any functionality with respect to private information, the user would enter "not applicable" in response to the questions posed by system 10 as further described below. In a preferred embodiment, another software module (not illustrated in the Figures) known as an Application Portal, retrieves information regarding applications that have already been defined in system 10. In field 85, the user identifies the application by name. In a preferred embodiment of the invention, a dropdown box is provided for field 85 so that the user can recall the data for a previously identified application and edit the information associated with that application if necessary. Once identified, the Application Portal is able to retrieve all of the information it has regarding an application and pre-populates the fields in screen 80. In field 90, the user describes the application. Field 95 is used to identify the location of the production server hosting the application, preferably by Street, City, State and Zip Code. Buttons 100 assists the user in identifying the location of the servers which support the application being described. Part of database 40 of system 10 (FIG. 1) contains the addresses of the enterprise where servers are located. Buttons 100 access this database and provide a selectable list of locations. The term "production" server indicates that the application is actually being used by the enterprise to process or store data used in the operation of the enterprise.

Field 105 is similarly used to identify the location of the development server that is being employed to develop the application. Field 110 is used to identify the location of the quality assurance (Q/A) server employed in the testing of the application. As with the identification of the production server in field 95, the development and Q/A servers in fields 105 and 110 are preferably identified by Street, City, State and Zip Code.

In field 115, the user identifies the current status of the application under review. The user is provided with the choices of identifying the application was being in development (120), in user acceptance testing, UAT (125), in production (130) or that the application has been retired (135).

Returning to FIG. 2, in step two of the process of the present invention, the Roles and Responsibilities with respect to the operation of the application are identified and input into system 10 for storage in database 40 (FIG. 1). The identification of the roles and responsibilities with the corporation with respect to the operation of an application is a very important exercise. Without clearly defined roles and responsibilities and specific employees of the corporation assigned these roles and responsibilities, the data privacy risks associated with the operation of the application can go undetected.

Figure 4:
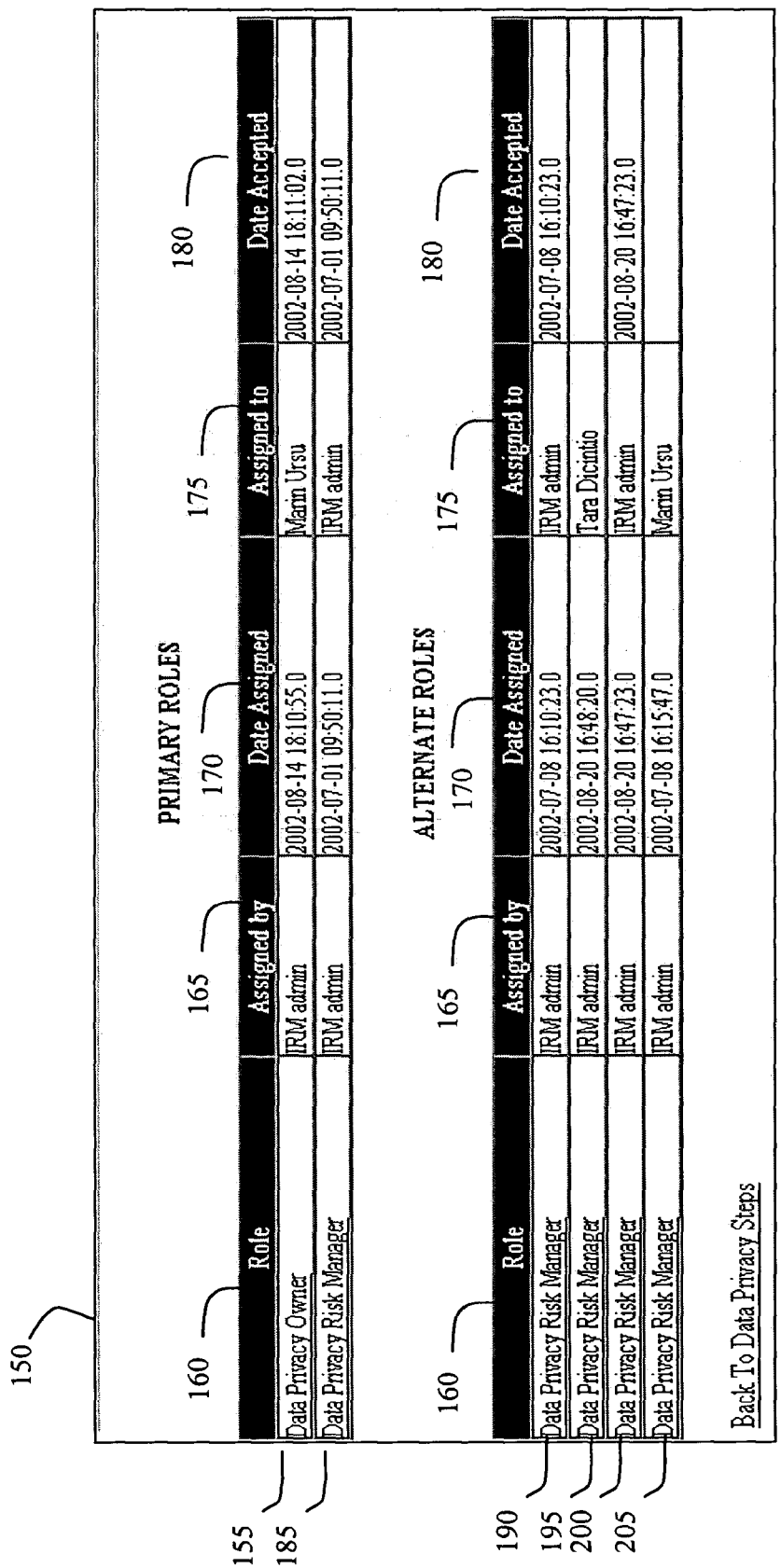
FIG. 4 depicts a user interface for defining roles and responsibilities.

FIG. 4 illustrates an input screen 150 for assigning personnel to the respective roles. This Figure illustrates two different roles that are preferably fulfilled with respect to the protection of privacy of data by applications of the enterprise: Data Privacy Owner 155; Data Privacy Risk Manager 185. Although two roles are illustrated in FIG. 4 as preferred, additional roles and responsibilities can be defined and assigned using the system of the present invention.

For each of the roles 155, 185, input screen 150 indicates who performed the assignment of the role 165, when the role was assigned 170, to whom the assignment was made 175 and the date on which the assignment was accepted 180. When an assignment is made, system 10 preferably sends the assignee an email notifying the person of the assignment and the responsibilities associated therewith (see below). The assignee preferably accepts the assignment by replying affirmatively to the email and system 10 updates the applicable database to record the assignment. When a manager is making assignments in input screen 150, some of the roles will have already been pre-populated as certain of the assignments relate to firm-wide responsibilities.

The following section describes the responsibilities of key ones of the roles in the present invention.

The Data Privacy Owner 155 is a manager in an area which generates or processes system information (e.g., application programs and related files), or produces products and services which depend upon system information. Each application of the enterprise must have an Data Privacy Owner 155 accountable for its protection. Applications that are cross-functional in nature, in that they serve the needs of multiple business units, preferably have a central Data Privacy Owner 155 that serves as a focal point. Data Privacy Owners 155 are assigned for every business unit using these applications.

In each case, the Data Privacy Owner's 155 responsibilities are the most extensive and involve ensuring compliance with the policies and procedures of the enterprise relative to the applications under her supervision. The Data Privacy Owner 155 is tasked with ensuring compliance with specific policies and procedures of the enterprise, including: developing, testing and maintaining the application in compliance with all data privacy regulations existing in the jurisdiction where the enterprise conducts business; ensuring that Outside Service Providers (OSPs) involved with the application develop, test and maintain the application in compliance with all data privacy regulations existing in the jurisdiction where the enterprise conducts business; ensuring that all data elements within the application and related files are classified according the data privacy impact rating; ensure that Risk Acknowledgments (see below) are in place for each area of non-compliance with data privacy policies; coordinate with local information owners to ensued that all of the responsibilities are properly fulfilled; ensure that the application is in compliance with Information Technology control policies; training employees, as needed, to comply with all data privacy regulations existing in the jurisdiction where the enterprise conducts business; inform all users of applications of the policies and procedures with respect to the application; identify an alternative Data Privacy Owner; and develop a Corrective Action Plan (see below) for any area of the application that is non-compliant.

The Data Privacy Risk Manager 185 generally reports to senior management within the enterprise and is responsible for ensuring that the enterprise complies with the enterprise's established data privacy control policies. The responsibilities of the Data Privacy Risk Manager 185 includes the following: coordinating the business unit's compliance with the enterprise's data privacy policies and procedures, as well as compliance with local, state and Federal regulations and laws related to data privacy; ensuring implementation of a data privacy awareness program for the business to address data privacy risks and to develop and offer Data Privacy Owner 155 and user training; administering the Risk Acknowledgement process and insuring they are performed by Data Privacy Owners 155 in compliance with the procedures of the enterprise; review and monitor technology audits and audit responses to validate the effectiveness of the response and the timeliness of any corrective actions; monitor on-going compliance with enterprise's data privacy policies and procedures, as well as compliance with local, state and Federal regulations and laws related to data privacy; ensure that a process is in place to assess technology platforms and associated applications for data privacy protection and compliance; ensure that a process is developed for the timely notification of terminated or transferred Data Privacy Owners 155 and insuring an alternate resource; insure the development and implementation of Corrective Action plans with respect to any area not in compliance with data privacy protection policies and procedures; and insure business units ensure compliance of their OSPs with respect to data privacy policies and procedures.

Screen 150 also allows the user to assign alternates to the one or more of the roles defined as the Primary Role. In the example depicted in FIG. 4, four alternatives were assigned to fulfill primary role of Data Privacy Risk Manager 190-205. Alternative people have been identify to fulfill this role as it is one of the most important relative to the protection of data privacy.

Returning for the moment to FIG. 2, in step 3 (60) of the process, the user assists in a determination of the impact of the application being reviewed with respect to data privacy. As previously described, this impact assessment is accomplished automatically by system 10 in response to the answers given by the user to a series of questions 255, 295-335 relative to the application. FIG. 5 illustrates an example of one of the automated questionnaires. Screen 250 asks the user a series of questions 255, 295-335 about several types of data that have privacy implications. For example, question 255 asks the user as to whether the application under review has contact with data containing anyone's Social Security number.

With respect to each of the questions 255, 295-335, system 10 provides the user with the ability to describe if and how the application has contact with the type of data and the nature of the contact. Specifically, system 10 asks the user if the application processes the data in question (260), whether it transmits the data 265, whether it collects the data itself 270 and whether it stores the data 275. System 10 further asks the user as to whether the data in question is data from a customer 280 or data from an employee of the enterprise 285. Typically, an application would process only customer 280 or employee 285 data, but certain applications (e.g., storage or transport applications) could have contact with both customer 280 and employee 285 data. System 10 additionally allows the user to answer Not Applicable (N/A) 290 with respect to any type of data, indicating that the application does not touch that type of data. The user is able to answer affirmatively to any of the questions 255, 295-335 by checking the selection box in the column 260-290 of the answer that applies. As seen in FIG. 5, some applications will perform several of the functions process 260, transmit 265, collect 270 and store 275 (e.g., see question 300).

As can be seen in FIG. 5, each of the types of data that the user is queried about is personal in nature. The examples of the types of data listed in FIG. 5 are: Social Security Number 255; Health related data (e.g., medical records, dental records) (295); Compensation data (e.g., stock options, bonus, incentives, payroll information) (300); Contributions/Donations (e.g., United Way, Blood Drives, College Funds) (305); Performance information (e.g., performance reviews, performance ratings) (310); Tuition Reimbursement (e.g., grades, courses taken) (315); License/Certification information (e.g., financial licenses, insurance certifications) (320); Work experience information (e.g., background checks, references, resumes) (325); Association/Committee affiliate information (e.g., membership in employee networking groups, memberships in external groups) (330); and Bio-metric information (e.g., fingerprints, hand scans, face scans, retinal scans, DNA) (335).

As seen in FIG. 5, there are links 350 to connect the user to other questionnaire input screens (not shown). In the embodiment illustrated in FIG. 5, thee are a total of three data privacy impact user interface screens. The other types of privacy data that these screens can query the user about include: Retirement information (e.g., 401K, pension, Social Security); Timekeeping information (e.g., vacation, sick days, personal days); Personal information (e.g., Employee Assistance Program participation); Birth Date (e.g., month, day, year, age); Drivers License information (e.g., license number, state); Email address (e.g., Uniform Resource Identifier, Internet Protocol); Credit information (e.g., history, credit rating, score); External Account/Financial information obtained from other organizations (e.g., account numbers used by customer or system, transactions, financials, linkages, status, privileges); Account Authorization Profile information (e.g., Personal Identification Number (PIN), challenge question, maiden name, mother's maiden name, recent transactions); Marketing Profile information (e.g., customer specific details/behaviors, customer lists, privacy preference information); Address information (e.g., postal, telephone, fax); Aggregate Marketing information (e.g., total transaction volume for a product or service, increase in sales, target market); Demographic information (e.g., gender, ethnicity, marital status, dependents, citizenship, resident status, education, profession, income range); and Residence information (e.g., own/rent, time in residence, multiple home ownership).

After the user has answered the questions on the data privacy impact assessment input screens (e.g., screen 250) she uses the Submit button 340 in order to have the data saved by system 10 in database 40 (FIG. 1). If the answers to the questions are incorrect (e.g., out of date due to changes in the application) the user can activate the Reset button 345 to clear the answers in columns 260-290. After submission and saving of the user's responses to the impact questions, system 10 automatically calculates the criticality of the data privacy impact rating of the application under review.

System 10 computes criticality rating for the application based on the responses provided by the user with respect to the questions described above. The analysis process of system 10 results in a privacy impact rating for the application of LOW to HIGH. The specific algorithm used to analyze and determine the overall data privacy impact rating of the application (in light of the manager's responses) is subject many factors including, among others, the types of data involved (e.g., Social Security number versus address) and the types of functionality performed by the application (e.g., storage, processing . . . ). The respective ratings of particular types of data are based upon industry/governmental guidelines. For example, Social Security numbers are ranked as High and demographic information is ranked as medium. These rankings are embedded in system 10. In a preferred embodiment, the application is assigned the criticality of the highest criticality of the data that is touched by the application.

Once system 10 has calculated the data privacy impact rating for the application, the rating is stored in database 40 (FIG. 1) and displayed to the user on screen 250. As seen on screen 250, system 10 actually calculates two separate data privacy impact ratings for each application under review, a customer data privacy impact rating 355 and an employee data impact rating 360.

The above described procedure for determining the data privacy impact rating for an application can, and is preferably performed for each of the applications identified in system 10. Although the data privacy impact rating for a particular application may be High, this does not mean that there is a problem with the application. It simply means that sensitivity that the enterprise should take with respect to the protection of the privacy data employed by this application is increased. As shown below, if the data privacy impact rating is High, the scrutiny given to the procedures of the enterprise for protecting the data is heightened. Furthermore, the acceptance of the risk associated with the data privacy aspects of the application is more carefully reviewed, in the preferred embodiment by higher levels of management.

Figure 6:
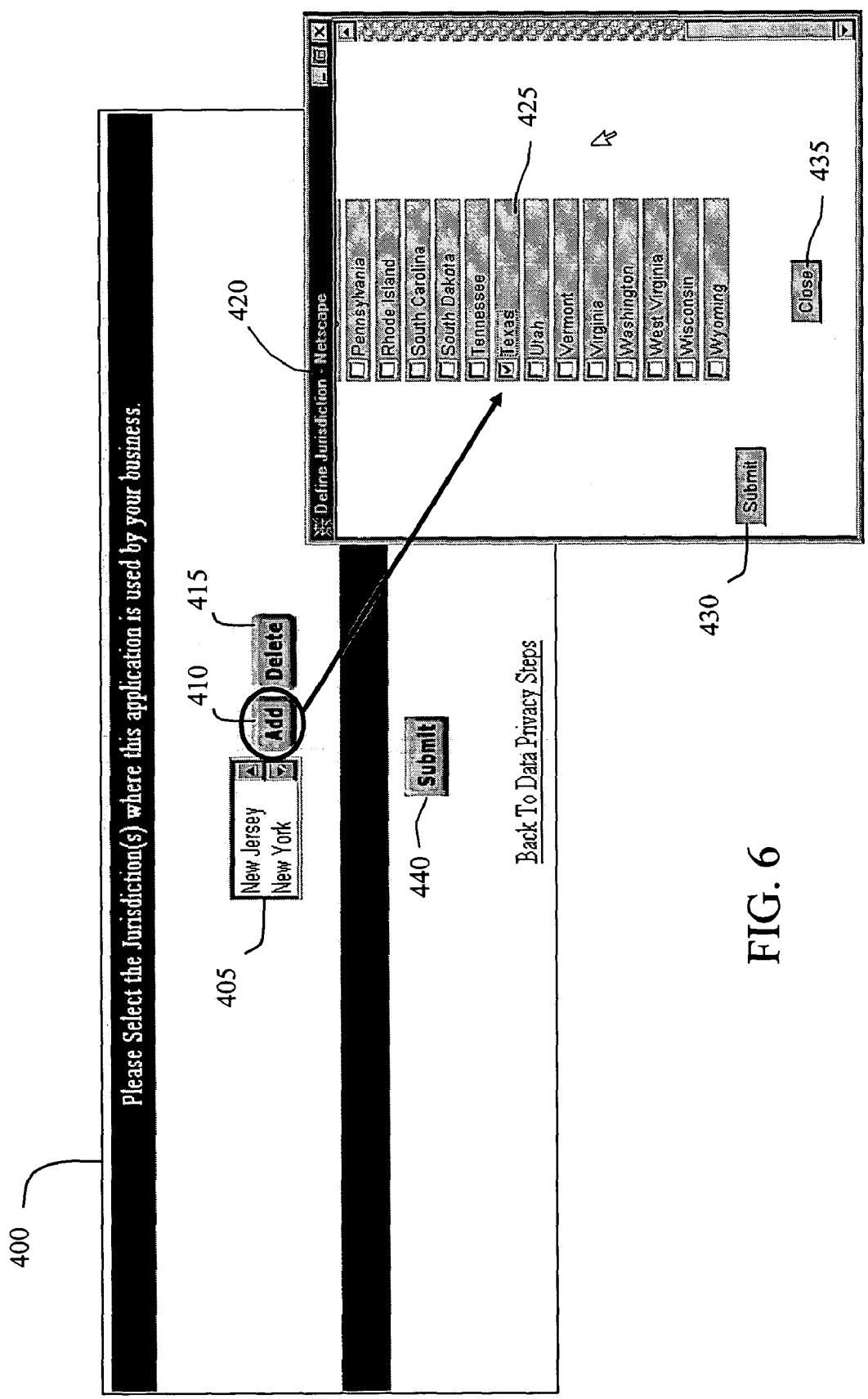
FIG. 6 illustrates jurisdiction user interface.

Returning to FIG. 2, in step four (element 65) the user is required to identify the applicable jurisdictions in which the application operates. User interface screen 400 as illustrated in FIG. 6 allows the user to identify the applicable jurisdictions to system 10. The applicable jurisdictions are input into area 405. To assist this input, screen 400 provides an Add button 410. Activation of this Add button 410 causes system 10 to display jurisdiction screen 420. Each jurisdiction in which the enterprise conducts business is displayed in area 425. The user is able to select each of the jurisdictions that are applicable to the application under review using the selection boxes next to the named jurisdictions in area 425. If the user does not want to make any selections from area 425, she may activate the Close button 435. Once the user has completed her selection(s) in area 425 she activates the Submit button 430 to populate the selections into the input area 405 in screen 400.

If the user erroneously inputs a jurisdiction into area 405, she can highlight the erroneous jurisdiction and then activate the Delete button 415 to delete the entry from area 405. Once all of the applicable jurisdictions have been input into area 405, the Submit button 440 is activated to cause system 10 store the jurisdictions in database 40 (FIG. 1) in association with the application under review. Database 40 also preferably contains the laws and regulations of each jurisdiction as they apply to data privacy. This database can be consulted when system 10 determines the compliance of the application with the laws and regulations of the jurisdictions in which the application operates as further described below.

Figure 7:
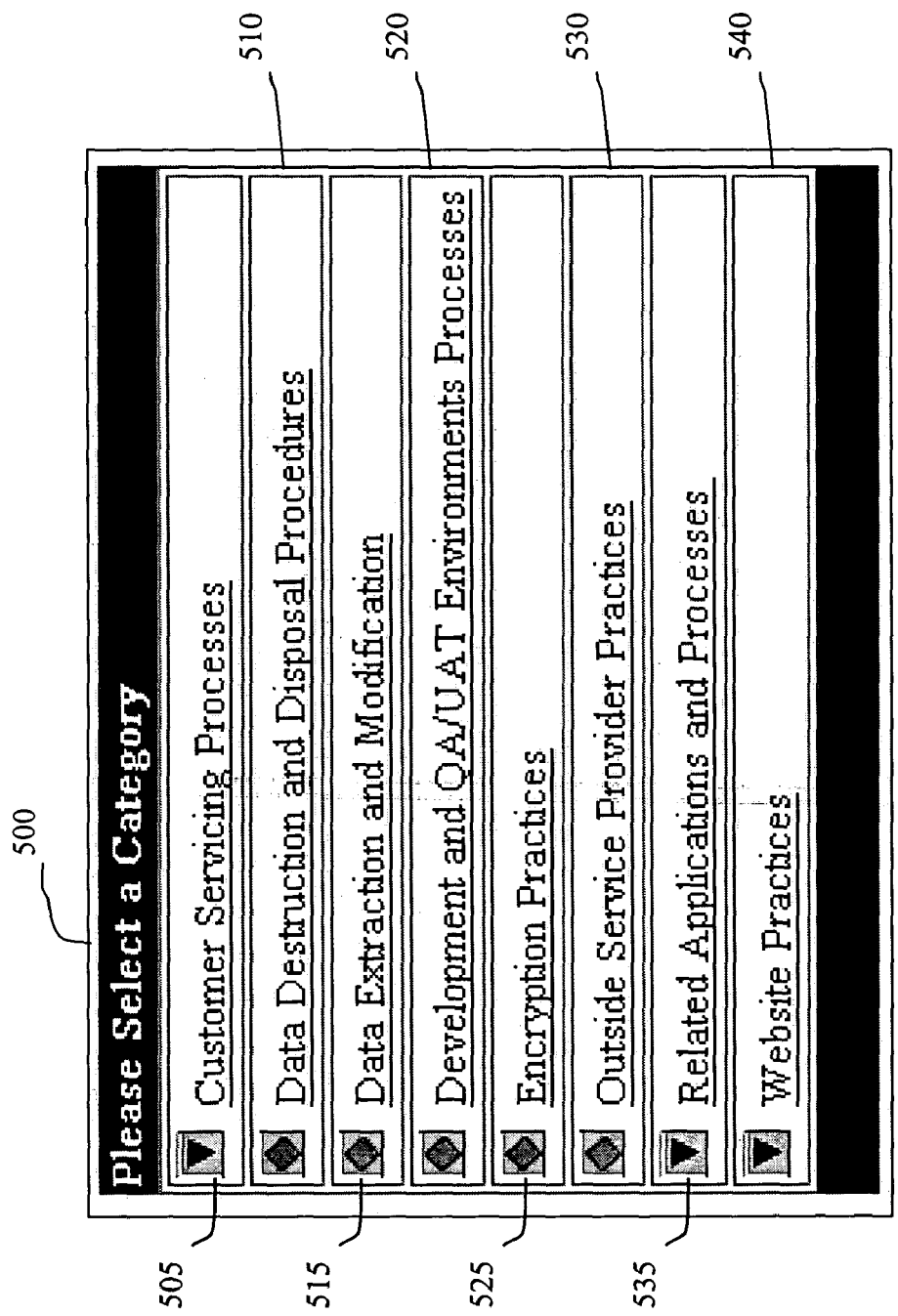
FIG. 7 is a user interface screen for selecting categories of processes for data privacy review.

Returning to FIG. 2, step five (70) of the process requires the user to classify the risk associated with the application with respect to data privacy. As depicted in FIG. 7, screen area 500 allows the user to select a category of the enterprise's privacy policy for assessing the application under review. The preferred categories include: Customer Services Processes 505; Data Destruction and Disposal Procedures 510; Data Extraction and Modification 515; Development and QA/UAT Environment Processes 520; Encryption Practices 525; OSP practices 530; Related Applications and Processes 535; and Website Practices; 540. Depending on the nature of the application under review, the user may select one or more of categories 505-540.

FIG. 8 illustrates the user interface 550 displayed by system 10 if the user selects Customer Servicing Processes, category 505 in FIG. 7. Screen area 575 depicts the questions posed to the user with respect to the Customer Servicing Processes aspects of the application as it relates to data privacy. As seen in this user interface screen 550, the user is asked to review the training and procedures of the customer service representatives. For example, the user is asked whether the employee providing customer services using the application has been trained with respect to the safeguarding of private information. Further questions asked in input interface 500 include: "Are customer service agents trained not to enter sensitive information into comment fields that may not require authorization?"; "Are there procedures that define what a customer service agent may deliver from this application to customers and/or employees via the e-mail contact channel?"; "Are there procedures that define what a customer service agent may deliver from this application to customers and/or employees via the fax contact channel?"; and "Are there procedures that define what a customer service agent may deliver from this application to customers and/or employees via the telephone contact channel?".

As illustrated in FIG. 8, questions 575 have areas for the user to provide responses in the form of Yes (555), No (560), N/A (565) answers. Additionally, screen 550 provides a Comments section 570. In the Comment section 570 the user can enter or attach a description of the control process(es) or any information, that supports or clarifies the user's responses. The user is advised to indicate what evidence exists to support the responses or cross-reference to the supporting documentation.

When a user provides a negative answer to any of the questions in any of the assessments in system 10, system 10 automatically asks the manager if she would like to develop a Corrective Action Plan (CAP) if the gap will be remediated within ninety days. As implied by its name, a Corrective Action Plan is a plan to correct the condition that has caused the manager to answer a question negatively. If the manager answers yes to developing a CAP, system 10 brings the manager to a CAP input screen in which the manager describes the condition which caused the negative response, the reason for the condition (e.g., funding) the plan to correct the condition, the person responsible for seeing that the correction is done, a target date by which the correction will be completed, and any attachments which are required to more fully explain the CAP. The CAP that is developed is stored in the database and appropriately linked to the records for this department. Comments section 570 indicates if a CAP is in place to correct the issue that caused the particular question to be answered negatively.

If the manager says "No" when asked if she wants to develop a CAP, the manager is automatically brought to a Risk Acknowledgement screen. In this screen, the manager is required to describe the reasons for the requirement of the Risk Acknowledgement; what compensating controls are in place, if any; the likelihood of an impact due to the risk involved (high, medium or low); a description of the potential impact; a rating of the potential impact (catastrophic, severe, moderate, negligible); and an implementation plan. The Risk Acknowledgement by the manager is reviewed and approved by the appropriate LOB management. If the Risk Acknowledgement is not approved by management, a CAP must be developed in order to correct the risk condition. Comments section 570 indicates if a Risk Acknowledgement (RA) is in place to acknowledge the risk associated with the issue that caused the particular question to be answered negatively.

Tables 1 through 7 illustrate preferred categories of questions and the preferred questions that are posed to the user in order to classify the risk associated with the data privacy aspects of the application under review.

TABLE 1

Data Destruction & Disposal Procedures:

| | |
|---|---|
| DD 1 | Are removable storage media used by this application to store or transfer personal financial and/or employees' information properly scratched, reformatted and/or destroyed to ensure our customers' and/or employees' privacy is protected? |
| DD 2 | Are there procedures in place to track when removable storage media are scratched, reformatted, and/or destroyed? If so, please attach the retention procedure documentation and denote the data disposal retention period. |

TABLE 2

Data Extraction & Modification Processes:

| | |
|---|---|
| DEM 1 | Is personal financial and/or employee information in the application's database/files safeguarded against unauthorized extraction or queries? If so, please define how this is done. |
| DEM 2 | Are unauthorized individuals prevented from exporting personal financial and/or employee information into a portable format - removable media, paper, spreadsheet, document, or text file? If so, please define how this is done. |
| DEM 3 | Are there procedures in place to prevent unauthorized individuals from modifying customers' personal financial and/or employees' information in the production environment? If so, please attach the procedure documentation. |
| DEM 4 | Are there procedures to monitor and track personal financial information transferred from this application's database/files into portable formats such as - removable media, paper, spreadsheet, document, or text file? If so, please attach the procedure documentation. |

TABLE 3

Development & QA/UAT Environments:

| | |
|---|---|
| DT 1 | Are security and procedures used in the development environment capable of protecting our customers' personal financial and/or employees' information? If so, please attach the procedure documentation. If not, is personal financial information removed from databases/files accessed via the development environment to ensure our customers' privacy is protected? |

TABLE 3-continued

Development & QA/UAT Environments:

| | |
|---|---|
| DT 2 | Are security and procedures used in the QA/UAT environment capable of protecting our customers' personal financial and/or employees' information? If so, please attach the procedure documentation. If not, is personal financial and/or employee information removed from databases/files accessed via the QA/UAT environment to ensure our customers' and/or employees' privacy is protected? |

TABLE 4

Encryption Practices:

| | |
|---|---|
| EP1 | Does this application encrypt data in storage? |
| EP2 | Does this application encrypt data that is transmitted? |
| EP3 | Please indicate which encryption product(s) is used by this application (list of applications to select from) |

TABLE 5

Outside Service Provider Practices:

| | |
|---|---|
| OSP 1 | Does the contract with the OSP include country/federal/state specific privacy and confidentiality clauses to ensure appropriate collection, use, and disclosure of customers' personal financial and/or employees' information to third parties? If so, please attach a copy of the contract. |
| OSP 2 | Are security and procedures used in the OSP's development environment capable of protecting our customers' personal financial information and/or employees' information? If so, please attach the OSP's procedure documentation. If not, is personal financial and/or employee information removed from databases/files accessed via the OSP's development environment to ensure our customers' and/or employees' privacy is protected? |
| OSP 3 | Are security and procedures used in the OSP's QA/UAT environment capable of protecting our customers' personal financial information and/or employees' information? If so, please attach the OSP's procedure documentation. If not, is personal financial and/or employee information removed from databases/files accessed via the OSP's QA/UAT environment to ensure our customers' and/or employees' privacy is protected? |
| OSP 4 | If personal financial and/or employee information from this application is used in production at an OSP's location, does the OSP have procedures in place to track and control personal financial and/or employee information transferred into portable formats such as - removable media, paper, spreadsheet, document, or text file? If so, please attach the OSP's procedure documentation. |
| OSP 5 | If personal financial and/or employee information from this application resides at an OSP's premises, do you have specific procedures defined to recall, retain, or destroy all personal financial and/or employee information from the OSP if & when you terminate the relationship or eliminate the application? |
| OSP 6 | Does the OSP use software tools such as web/e-mail bugs or cookies to monitor user behavior when delivering a enterprise product or service? If so, does the OSP's policy comply with the enterprise's Online Consumer Information Practices? |
| OSP 7 | Does this OSP send or receive our customers' personal financial and/or employees' information? If so, please attach the file/feed names, record layout/field details, frequency of transmission/delivery, and method of transmission/delivery/encryption. |

TABLE 6

Related Applications & Processes:

| | |
|---|---|
| OAP 1 | Please select all applications that have access to personal financial and/or employee information in this application's database/files. (Note: the preferred embodiment, the user interface associated with this question has a list of applications |

TABLE 6-continued

Related Applications & Processes:

| | |
|---|---|
| | to select from.) |
| OAP 2 | If other applications use personal financial and/or employee information from this application, are security and procedures used in the development environment capable of protecting our customers' personal financial and/or employees' information? If not, is personal financial and/or employee information removed from databases/files accessed via the development environment to ensure our customers' and/or employees' privacy is protected? |
| OAP 3 | If other applications use personal financial and/or employee information from this application, are security and procedures used in the QA/UAT environment capable of protecting our customers' personal financial and/or employees' information? If not, is personal financial and/or employee information removed from databases/files accessed via the QA/UAT environment to ensure our customers' and/or employees' privacy is protected? |

TABLE 7

Website Practices:

| | |
|---|---|
| WEB 1 | Is a privacy policy link included on every page of the website? |
| WEB 2 | If the personal financial and/or employee information sharing practices for this product differ from what is stated in the enterprise's standard Internet privacy policy, a distinct privacy policy is needed. Have the components of the standard Internet privacy policy been compared to that of this product to ensure that an accurate privacy policy is in place? |
| WEB 3 | Has the account opening process been tested to ensure the privacy policy is presented to and acknowledged by the customer prior to an account being established? |
| WEB 4 | If the website collects opt out selections from the customer, is this information fed into the Customer Information File (CIF)? |

As illustrated in Tables. 1-7, the system and process of the present invention provides a systematic, standardized and comprehensive review of the data privacy issues associated with the applications employed by an enterprise. For areas that require attention or do not meet policy compliance, a corrective action, risk acknowledgment or risk acceptance process will automatically be invoked. Such processes identify the condition, remediation plan, identification of accountable personnel and targeted deadlines for implementation.

A determination is made on whether the application is in compliance with the privacy guidelines, either by meeting all the requirements of the applicable policies or categories in the various risk assessments, or by having an approved process or plan in place to achieve compliance. If the application is compliant, then the indicators displayed in FIG. 9 (see below) branches to compliant indicator. A compliant indicator provides a visual indication that is displayed to the user to show that the particular application is in compliance with the privacy guidelines established by various reliable resources (such as local, state and federal agencies).

Figures 9, 10:
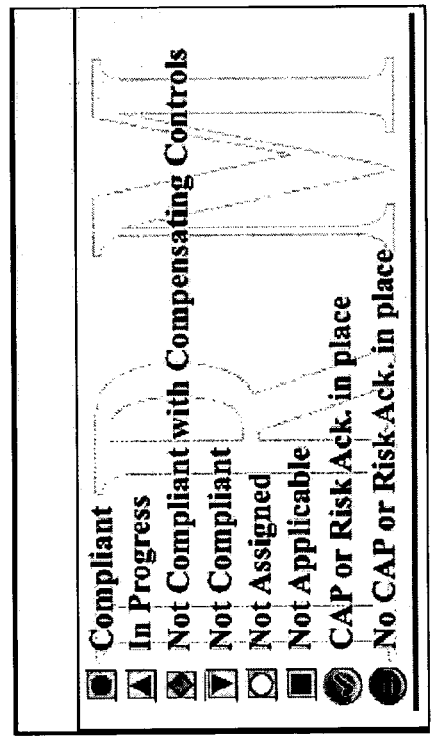
FIG. 9 illustrates a State of Health Report Card status screen.
FIG. 10 depicts a legend to the icons depicted in FIGS. 9 and 11.

One of the significant features of the present invention is the ability of system 10 to rollup all of the collected information into clear and easily comprehensive status report. FIG. 9 illustrates one such report, in the form of a computer screen, known as a State of Health Report Card 600. This report 600 provides enhanced capabilities to track and monitor key issues and their ongoing progress to close substantial gaps. Report 600 provides the highest level of status of the reviews of the data privacy aspects of the applications as described above, including corrective actions plans, risk acknowledgments and board issues as further described below. This status screen 600 provides a core repository to manage, monitor and measure the risk associated with data privacy of the applications utilized by the enterprise.

As seen in FIG. 9, this status screen 600 contains the status of the data privacy issues 605, corrective actions plans 610, risk acknowledgments 615, and board issues 620. A record 630 is capable of being displayed for each line of business 625 within the organization (only four illustrated in FIG. 9). For each record 630, the name of the Senior Business Executive 635 and the name of the Line of Business 625 is displayed. The actual name of the Line of Business 625 is a hyperlink that brings up a status screen comparable to screen 600, except that it shows the status of the elements for the next level down in the corporate hierarchy (e.g., the department level). Using this feature, a user is able to drill down (or roll up) to the level of status desired by the particular user.

The status of the issues associated with the data privacy review of the applications used by a Line of Business is depicted as a colored icon, e.g., icon 640. Each icon represents a different status. In addition to each icon being a different color, it is also a different shape. This allows user having devices without color capability to quickly determine the status of a particular item. FIG. 10 illustrates a legend containing the different icons and their associated statuses. In the particular statuses depicted in FIG. 9, status 640 indicates that there is one or more application in use by the line of business that is not in compliance with one or more of the procedures or policies of the enterprise or laws or regulations of the jurisdictions in which the applications operate.

It should be apparent that while the user is presented with a visual indication of risk status as a result of the process shown in FIG. 2, the status need not be a visual indication as illustrated in FIG. 10, but rather can be any kind of indicia that informs the user about the level of risk for a given application. For example, risk indications can be in the form of audible warnings or in a printed format. While the preferred embodiments of the present invention provides status indicators of different color, namely, green for compliant, amber for warning, red for critical, blue for incomplete and gray for pending approval, the present invention should not be considered to be so limited in general. For example, an indication of risk status based on indicators of varying shape can be used to inform users of risk status on electronic devices that do not have color displays. Alternately, a color and shape indication can be used in combination to permit the present system to be used in a number of platforms in a flexible manner. Numerous other forms of indicators should be apparent to those skilled in the art, which are not mentioned here for the sake of brevity, but should nevertheless be considered to be within the scope of the present invention.

As indicated by icon 645, there is a Corrective Action Plan (CAP) in place to address the non compliance indicated by icon 640. As previously described, this CAP is documented on system 10. By clicking on the status icon 645 in the Corrective Action Plan column 610, the user can immediately bring up the CAP developed by the manager. If the manager did not develop a CAP, but rather performed a Risk Acknowledgement, this is indicated in column 650. Similarly, by clicking on the icon 650 in Risk Acknowledgement column 615, the user is be able to see the specific Risk Acknowledgement developed by the manager.

If the user clicks on one of the status icons in the Data Privacy column 605, system 10 drills down the data to the next level of status as illustrated in FIG. 11. State of Health status screen 700 gives the manager a more detailed look at the status of the reviews of any particular application employed by the particular line of business. Column 705 contains the name of the particular application. As seen in FIG. 11, six different applications 765 have been identified as employed by the selected LOB. Column 710 provides name of the Information Owner as previously described with respect to FIG. 4. Columns 715 and 720 respectively provide the data privacy impact rating of the application with respect to customers and employees as previously described with respect to FIG. 5. Column 725 contains the icons, as described above, that indicate the status of the particular application with respect to data privacy (e.g., compliant, non-compliant).

As with the Line of business as a whole described above with respect to Status Screen 600 (FIG. 9), column 725 provides the status of the application with respect to any CAPs that have been formulated to address the issue that cause non-compliance. As further described above, clicking of the icons in column 730 allows the user to actually review the documentation associated with the CAP for that application. Similarly, screen 700 provides a Risk Acknowledgement status column 735 and Control Issue status column 740 providing the status of these items that are required by negative assessments of any of the reviews as discussed above.

Figure 12:
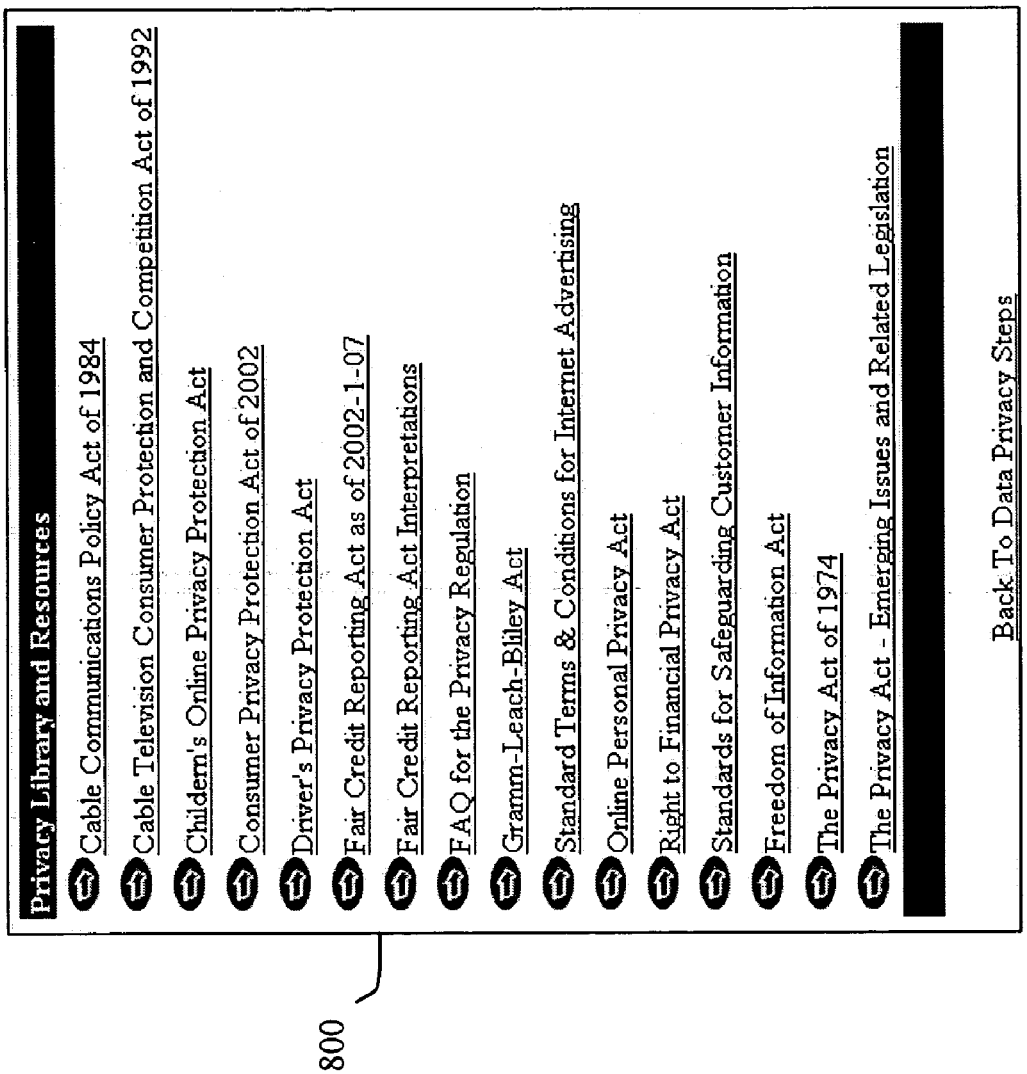
FIG. 12 illustrates a resource user interface.

Returning to FIG. 2, step six (element 75) of the process is provide the user with access to the collection, library, of data privacy materials that has been collected by the enterprise. FIG. 12 illustrates a user interface screen 800 for providing the user with this access. Each of the items on this screen is a hyperlink the privacy materials described in the item's title. Broadly the types of materials include a list of the contacts within the enterprise that are able to assist the user with questions about data privacy, privacy papers generated by the enterprise, the enterprise's policies and procedures with respect to data privacy, U.S. Federal Legislation, U.S. State Legislation, International Legislation, other privacy materials and a privacy glossary Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A method for an enterprise to manage privacy of information, the method comprising:
    identifying application information that describes at least one software application used by the enterprise;
    storing the application information in a database;
    identifying types of information that are contained in or used by the application;
    storing the types of information in the database;
    determining jurisdiction information that describes the jurisdictions in which the application operates;
    storing the jurisdiction information in the database;
    identifying the procedures used to protect the privacy of the types of information;
    storing procedural information related to the procedures in the database;
    automatically determining a compliance rating associated with the application;
    storing the compliance rating in the database;
    providing status data from the database, wherein the status data comprises at least the compliance rating; and
    identifying at least one category of functionality performed by the application, where in the procedures used to protect the privacy varies by the category of functionality.

2. The method according to claim 1, wherein the at least one category comprises at least one of: customer services processes; data destruction and disposal procedures; data extraction and modification; development environment processes; encryption practices; outside service provider practices; related applications and processes; and website practices.

3. A method for an enterprise to manage privacy of information, the method comprising:
    identifying application information that describes at least one software application used by the enterprise;
    storing the application information in a database;
    identifying types of information that are contained in or used by the application;
    storing the types of information in the database;
    determining jurisdiction information that describes the jurisdictions in which the application operates;
    storing the jurisdiction information in the database;
    identifying the procedures used to protect the privacy of the types of information;
    storing procedural information related to the procedures in the database;
    automatically determining a compliance rating associated with the application;
    storing the compliance rating in the database; and
    providing status data from the database, wherein the status data comprises at least the compliance rating;
    wherein the types of information that are contained in or used by the application comprises at least one of: Social Security number; health related information; compensation information; contributions/donation information; employee performance review information; tuition reimbursement information; license and certification information; work experience information; association information; and bio-metric information.

4. A method for an enterprise to manage privacy of information, the method comprising:
    identifying application information that describes at least one software application used by the enterprise;
    storing the application information in a database;
    identifying types of information that are contained in or used by the application;
    storing the types of information in the database;
    determining jurisdiction information that describes the jurisdictions in which the application operates;
    storing the jurisdiction information in the database;
    identifying the procedures used to protect the privacy of the types of information;
    storing procedural information related to the procedures in the database;
    automatically determining a compliance rating associated with the application;
    storing the compliance rating in the database;
    providing status data from the database, wherein the status data comprises at least the compliance rating; and
    determining a type of functionality conducted with respect to each type of information.

5. The method according to claim 4, wherein the type of functionality comprises at least one of the following: processing; transmitting; collecting; and storing.

6. The method according to claim 5, further comprising determining a information privacy impact rating for the application in response to the types of functionality and types of information.

7. The method according to claim 6 further comprising:
determining if the application has functionality with respect to customer data and employee data; and
wherein the step of determining the information privacy impact rating further comprises determining a customer information privacy impact rating and an employee information privacy impact rating.

8. A method for an enterprise to manage privacy of information, the method comprising:
identifying application information that describes at least one software application used by the enterprise;
storing the application information in a database;
identifying types of information that are contained in or used by the application;
storing the types of information in the database;
determining jurisdiction information that describes the jurisdictions in which the application operates;
storing the jurisdiction information in the database;
identifying the procedures used to protect the privacy of the types of information;
storing procedural information related to the procedures in the database;
automatically determining a compliance rating associated with the application;
storing the compliance rating in the database; and
providing status data from the database, wherein the status data comprises at least the compliance rating;
wherein the step of automatically determining the compliance rating associated with the application is in response to the jurisdiction information.

9. The method according to claim 8, wherein the jurisdiction information is used to determine if the application complies with the laws of the jurisdictions in which the application operates.

10. A method for an enterprise to manage privacy of information, the method comprising:
identifying application information that describes at least one software application used by the enterprise;
storing the application information in a database;
identifying types of information that are contained in or used by the application;
storing the types of information in the database;
determining jurisdiction information that describes the jurisdictions in which the application operates;
storing the jurisdiction information in the database;
identifying the procedures used to protect the privacy of the types of information;
storing procedural information related to the procedures in the database;
automatically determining a compliance rating associated with the application;
storing the compliance rating in the database;
providing status data from the database, wherein the status data comprises at least the compliance rating; and
assigning specific people to fulfill roles with respect to managing the privacy of information, wherein the roles include at least one of data privacy owner and data privacy risk manager.

11. The method according to claim 10, further comprising:
receiving acknowledgements of the acceptances of the assignments from the specific people.

12. The method according to claim 10, further comprising:
assigning alternate people to fulfill the roles.

13. A method for an enterprise to manage privacy of information, the method comprising:
identifying application information that describes at least one software application used by the enterprise;
storing the application information in a database;
identifying types of information that are contained in or used by the application;
storing the types of information in the database;
determining jurisdiction information that describes the jurisdictions in which the application operates;
storing the jurisdiction information in the database;
identifying the procedures used to protect the privacy of the types of information;
storing procedural information related to the procedures in the database;
automatically determining a compliance rating associated with the application;
storing the compliance rating in the database; and
providing status data from the database, wherein the status data comprises at least the compliance rating;
wherein all of the steps of the method are facilitated using a software application, the method further comprising:
generating data input screens for accepting input from a user; and
providing drop down boxes on the data input screens in order to facilitate selection of predefined information.

14. A method for an enterprise to manage privacy of information, the method comprising:
identifying application information that describes at least one software application used by the enterprise;
storing the application information in a database;
identifying types of information that are contained in or used by the application;
storing the types of information in the database;
determining jurisdiction information that describes the jurisdictions in which the application operates;
storing the jurisdiction information in the database;
identifying the procedures used to protect the privacy of the types of information;
storing procedural information related to the procedures in the database;
automatically determining a compliance rating associated with the application;
storing the compliance rating in the database; and
providing status data from the database, wherein the status data comprises at least the compliance rating;
wherein the step of providing status data further comprises:
providing status data on the enterprise level;
providing status data on a line of business level; and
providing status data on a department level.

15. A method for an enterprise to manage privacy of information, the method comprising:
identifying application information that describes at least one software application used by the enterprise;
storing the application information in a database;
identifying types of information that are contained in or used by the application;
storing the types of information in the database;

determining jurisdiction information that describes the jurisdictions in which the application operates;
storing the jurisdiction information in the database;
identifying the procedures used to protect the privacy of the types of information;
storing procedural information related to the procedures in the database;
automatically determining a compliance rating associated with the application;
storing the compliance rating in the database;
providing status data from the database, wherein the status data comprises at least the compliance rating; and
developing a corrective action plan if the application is not in compliance with the procedures, the corrective action plan containing the steps required to bring the application into compliance.

16. The method according to claim 15, further comprising obtaining an acknowledgement by management of the enterprise of risk associated with the non-compliance of the application.

17. A system for an enterprise to manage privacy of information comprising:
a user interface for interfacing with users of the system;
at least one database server and at least one application server coupled to the user interface; and
at least one database and at least one application respectively coupled to the database server and the application server;
wherein the system is programmed to:
accept application information that describes at least one software application used by the enterprise;
store the application information in a database;
accept types of information that are contained in or used by the application;
store the types of information in the database;
accept jurisdiction information that describes the jurisdictions in which the application operates;
store the jurisdiction information in the database;
accept the procedures used to protect the privacy of the types of information;
store procedural information related to the procedures in the database;
automatically determine a compliance rating associated with the application;
store the compliance rating in the database; and
provide status data from the database, wherein the status data comprises at least the compliance rating.

18. The system according to claim 17, wherein the user interface is used to accept at least one category of functionality performed by the application, where in the procedures used to protect the privacy varies by the category of functionality.

19. The system according to claim 18, wherein the at least one category comprises at least one of; customer services processes; data destruction and disposal procedures; data extraction and modification; development environment processes; encryption practices; outside service provider practices; related applications and processes; and website practices.

20. The system according to claim 18, wherein the types of information that are contained in or used by the application comprises at least one of: Social Security number; health related information; compensation information; contributions/donation information; employee performance review information; tuition reimbursement information; license and certification information; work experience information; association information; and bio-metric information.

21. The system according to claim 18, wherein the user interface is used to accept a type of functionality conducted with respect to each type of information.

22. The system according to claim 21, wherein the type of functionality comprises at least one of the following: processing; transmitting; collecting; and storing.

23. The system according to claim 21, wherein the system is programmed to determine an information privacy impact rating for the application in response to the types of functionality and types of information.

24. The system according to claim 23, wherein:
the user interface is further used to accept user input indicating if the application has functionality with respect to customer data and employee data; and
the system is further programmed to determine a customer information privacy impact rating and an employee information privacy impact rating.

25. The system according to claim 18, wherein the system is programmed to automatically determine the compliance rating associated with the application is in response to the jurisdiction information.

26. The system according to claim 25, wherein the jurisdiction information is used to determine if the application complies with the laws of the jurisdictions in which the application operates.

27. The system according to claim 18, wherein the database further includes;
assignments of specific people to fulfill roles with respect to managing the privacy of information, wherein the roles include at least one of data privacy owner and data privacy risk manager.

28. The system according to claim 27, wherein the database further includes;
acknowledgements of the acceptances of the assignments from the specific people.

29. The system according to claim 27, wherein the database further includes;
assignments of alternate people to fulfill the roles.

30. The system according to claim 18, wherein user interface further comprises;
data input screens for accepting input from a user; and
drop down boxes on the data input screens in order to facilitate selection of predefined information.

* * * * *